US008996450B1

(12) United States Patent
Rubio

(10) Patent No.: US 8,996,450 B1
(45) Date of Patent: Mar. 31, 2015

(54) SYSTEM AND METHOD FOR ALLOCATING RESOURCES IN A MIXED SSD AND HDD STORAGE ENVIRONMENT

(71) Applicant: Teradata Corporation, Dayton, OH (US)

(72) Inventor: Paul Anthony Rubio, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 0 days.

(21) Appl. No.: 13/731,057

(22) Filed: Dec. 30, 2012

Related U.S. Application Data

(60) Provisional application No. 61/582,280, filed on Dec. 31, 2011.

(51) Int. Cl.
*G06F 17/30* (2006.01)
*G06F 3/06* (2006.01)

(52) U.S. Cl.
CPC ........ *G06F 17/30592* (2013.01); *G06F 3/0659* (2013.01)
USPC ....................................................... 707/602

(58) Field of Classification Search
None
See application file for complete search history.

(56) References Cited

U.S. PATENT DOCUMENTS

| 7,127,545 | B1* | 10/2006 | Nandi et al. ................. 710/316 |
|---|---|---|---|
| 2002/0065833 | A1* | 5/2002 | Litvin ......................... 707/200 |
| 2006/0184565 | A1* | 8/2006 | Nishikawa et al. ........... 707/102 |
| 2008/0184003 | A1* | 7/2008 | Ono ............................. 711/170 |
| 2008/0244209 | A1* | 10/2008 | Seelam et al. ................ 711/168 |
| 2010/0191876 | A1* | 7/2010 | Muppirala et al. ............. 710/39 |
| 2010/0274827 | A1* | 10/2010 | Hix et al. ..................... 707/813 |
| 2011/0179247 | A1* | 7/2011 | Mine et al. ................... 711/171 |
| 2012/0066449 | A1* | 3/2012 | Colgrove et al. ............. 711/114 |
| 2012/0102501 | A1* | 4/2012 | Waddington et al. ......... 718/105 |
| 2012/0109936 | A1* | 5/2012 | Zhang et al. ................. 707/713 |
| 2012/0173831 | A1* | 7/2012 | Rubio et al. ................. 711/165 |
| 2012/0254513 | A1* | 10/2012 | Uehara et al. ................ 711/103 |
| 2013/0111171 | A1* | 5/2013 | Hirezaki et al. .............. 711/165 |
| 2013/0339599 | A1* | 12/2013 | Sundrani ..................... 711/114 |

* cited by examiner

*Primary Examiner* — Robert Beausoliel, Jr.
*Assistant Examiner* — Richard Bowen
(74) *Attorney, Agent, or Firm* — James Stover

(57) ABSTRACT

A system and method for allocating storage devices within a database system including fast solid state storage devices (SSDs) and traditional hard drive storage device (HDDs). The method repetitively collects temperature and queue depth data for each storage device, and determines from the collected data points a service time for each storage device. The method then selects, in response to an allocation request, a storage device having a minimum total wait time determined from the current queue depth and service time for each storage device.

8 Claims, 5 Drawing Sheets

SYSTEM AND METHOD FOR ALLOCATING RESOURCES IN A MIXED SSD AND HDD STORAGE ENVIRONMENT

CROSS REFERENCE TO RELATED APPLICATIONS

This application claims priority under 35 U.S.C. §119(e) to the following commonly-assigned patent applications, which are incorporated herein by reference:

Provisional Patent Application Ser. No. 61/582,280, entitled "IMPROVED SYSTEM AND METHOD FOR ALLOCATING RESOURCES IN A MIXED SSD AND HDD STORAGE ENVIRONMENT," filed on Dec. 31, 2011, by Paul Rubio.

FIELD OF THE INVENTION

The present invention relates to data warehouse systems, and more particularly, to an improved system and method for allocating resources in a mixed SSD and HDD storage environment

BACKGROUND OF THE INVENTION

Solid state storage, in particular, flash-based devices either in solid state drives (SSDs) or on flash cards, is quickly emerging as a credible tool for use in enterprise storage solutions. Ongoing technology developments have vastly improved performance and provided for advances in enterprise-class solid state reliability and endurance. As a result, solid state storage, specifically flash storage deployed in SSDs, are becoming vital for delivering higher performance to servers and storage systems, such as the data warehouse system illustrated in FIG. 1.

The system illustrated in FIG. 1, a product of Teradata Corporation, is a hybrid data warehousing platform that provides the capacity and cost benefits of hard disk drives (HDDs) while leveraging the performance advantage of solid-state drives (SSDs). As shown the system includes multiple physical processing nodes 101, connected together through a communication network 105. Each processing node may host one or more physical or virtual processing modules, such as one or more access module processors (AMPs). Each of the processing nodes 101 manages a portion of a database that is stored in a corresponding data storage facility including SSDs 120, providing fast storage and retrieval of high demand "hot" data, and HDDs 110, providing economical storage of lesser used "cold" data.

Teradata Virtual Storage (TVS) software 130 manages the different storage devices within the data warehouse, automatically migrating data to the appropriate device to match its temperature. TVS replaces traditional fixed assignment disk storage with a virtual connection of storage to data warehouse work units, referred to as AMPs within the Teradata data warehouse. FIG. 2 provides an illustration of allocation of data storage in a traditional Teradata Corporation data warehouse system, wherein each AMP owns the same number of specific disk drives and places its data on those drives without consideration of data characteristics or usage.

FIG. 3 provides an illustration of allocation of data storage in a Teradata Corporation data warehouse system utilizing Teradata Virtual Storage (TVS). Storage is owned by Teradata Virtual Storage and is allocated to AMPs in small pieces from a shared pool of disks. Data are automatically and transparently migrated within storage based on data temperature. Frequently used hot data is automatically migrated to the fastest storage resource. Cold data, on the other hand, is migrated to slower storage resources.

Teradata Virtual Storage allows a mixture of different storage mechanisms and capacities to be configured in an active data warehouse system. TVS blends the performance-oriented storage of small capacity drives with the low cost-per-unit of large capacity storage drives so that the data warehouse can transparently manage the workload profiles of data on the storage resources based on application of system resources to the usage.

Systems for managing the different storage devices within the data warehouse, such as TVS, are described in U.S. Pat. No. 7,562,195; and United States Patent Application Publication Number 2010-0306493, which are incorporated by reference herein.

Many of the prior systems for managing storage devices within a data warehouse were homogenous with respect to configured storage devices, e.g., HDDs, and allocations were placed on devices with the smallest queue depth. With the inclusion of SSDs and HDDs in the data warehouse, some of these systems may over-utilize the SSDs, while at the same time under utilize HDDs. A new method of answering allocation placement questions in systems comprised of different classes of SSD and HDD devices with devices shared amongst AMPs is desired. Described below is an improved system and method for allocating resources in a mixed SSD and HDD storage environment.

DETAILED DESCRIPTION OF THE INVENTION

Figure 1:
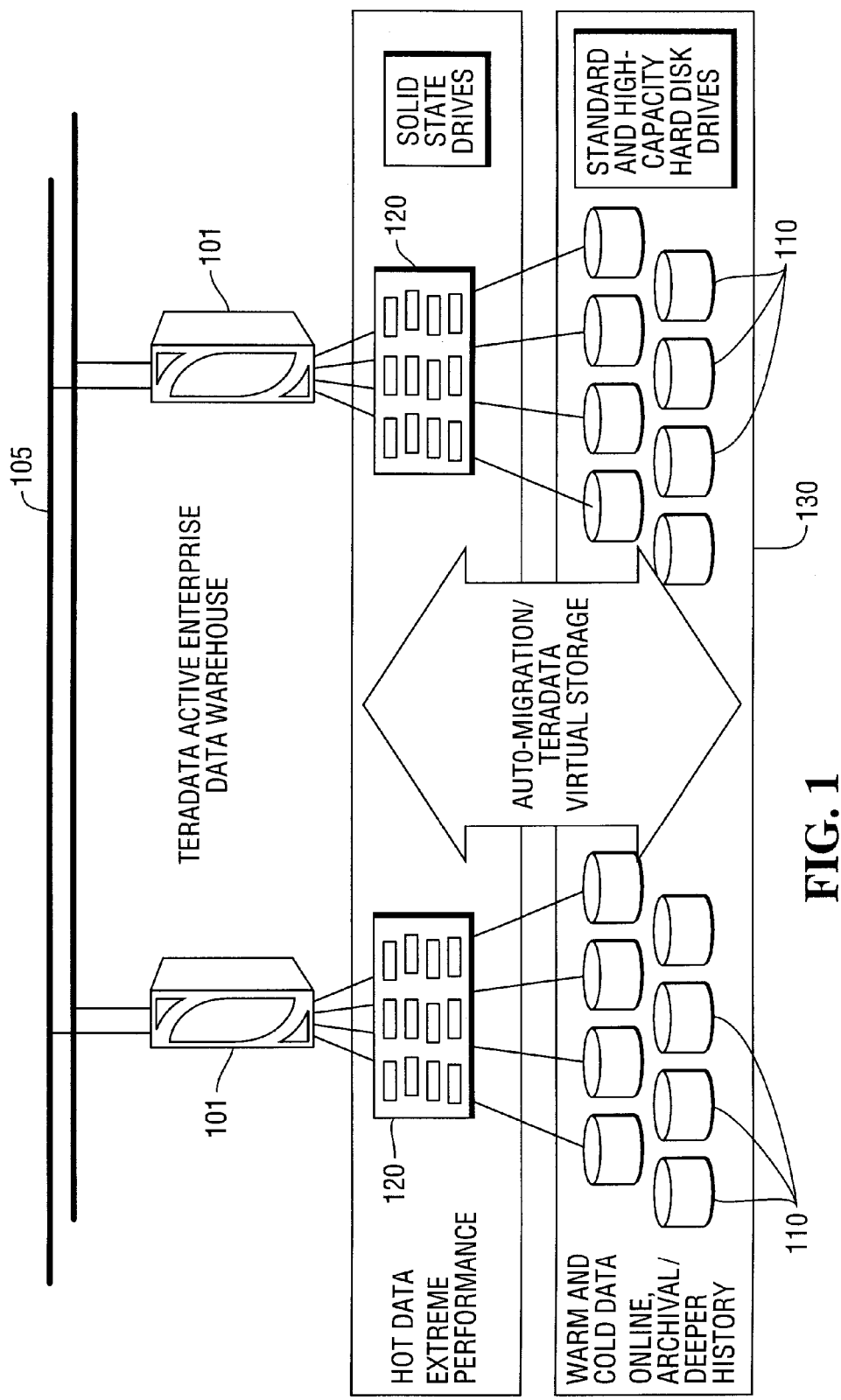
FIG. 1 is an illustration of a multiple-node database system employing SSD storage devices and conventional disk storage devices.
Figure 2:
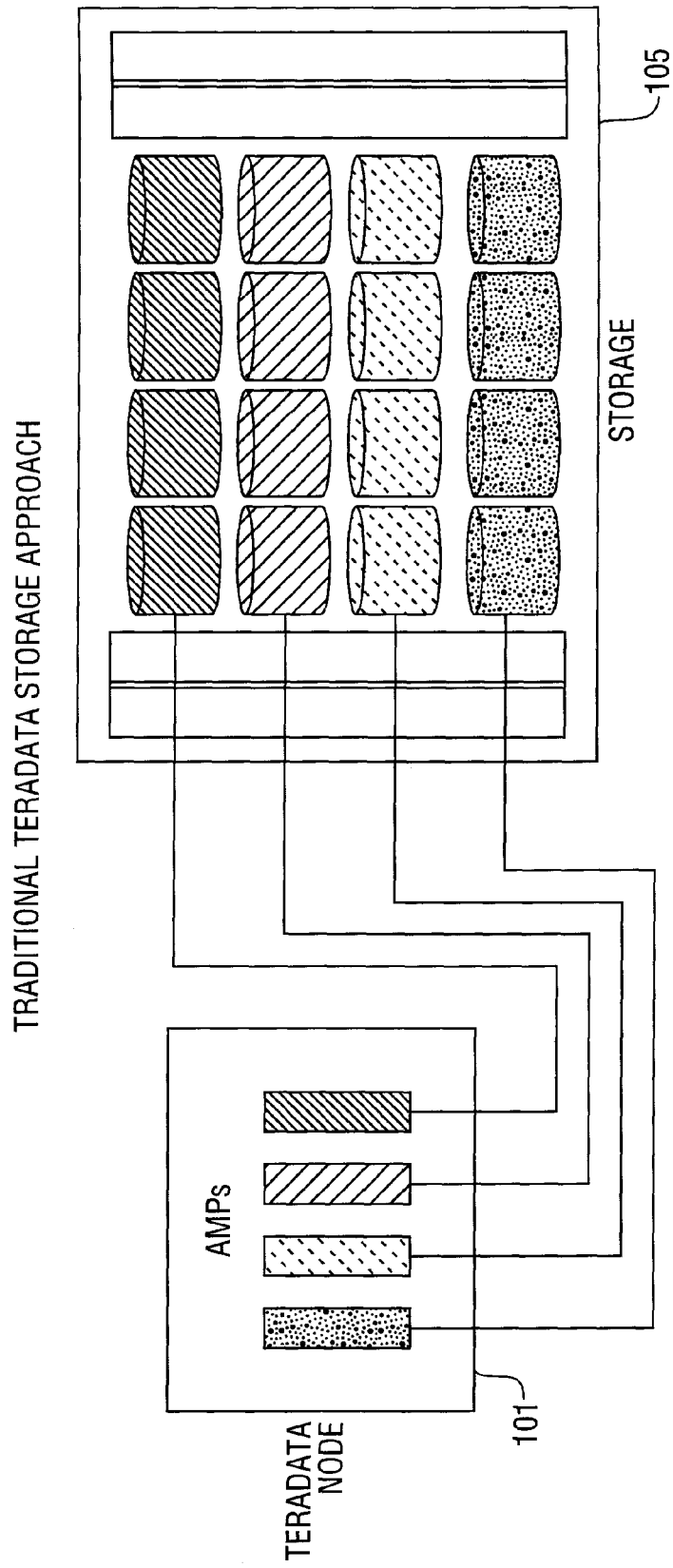
FIG. 2 is a simple illustration of the allocation of data storage in a traditional Teradata Corporation data warehouse system.
Figure 3:
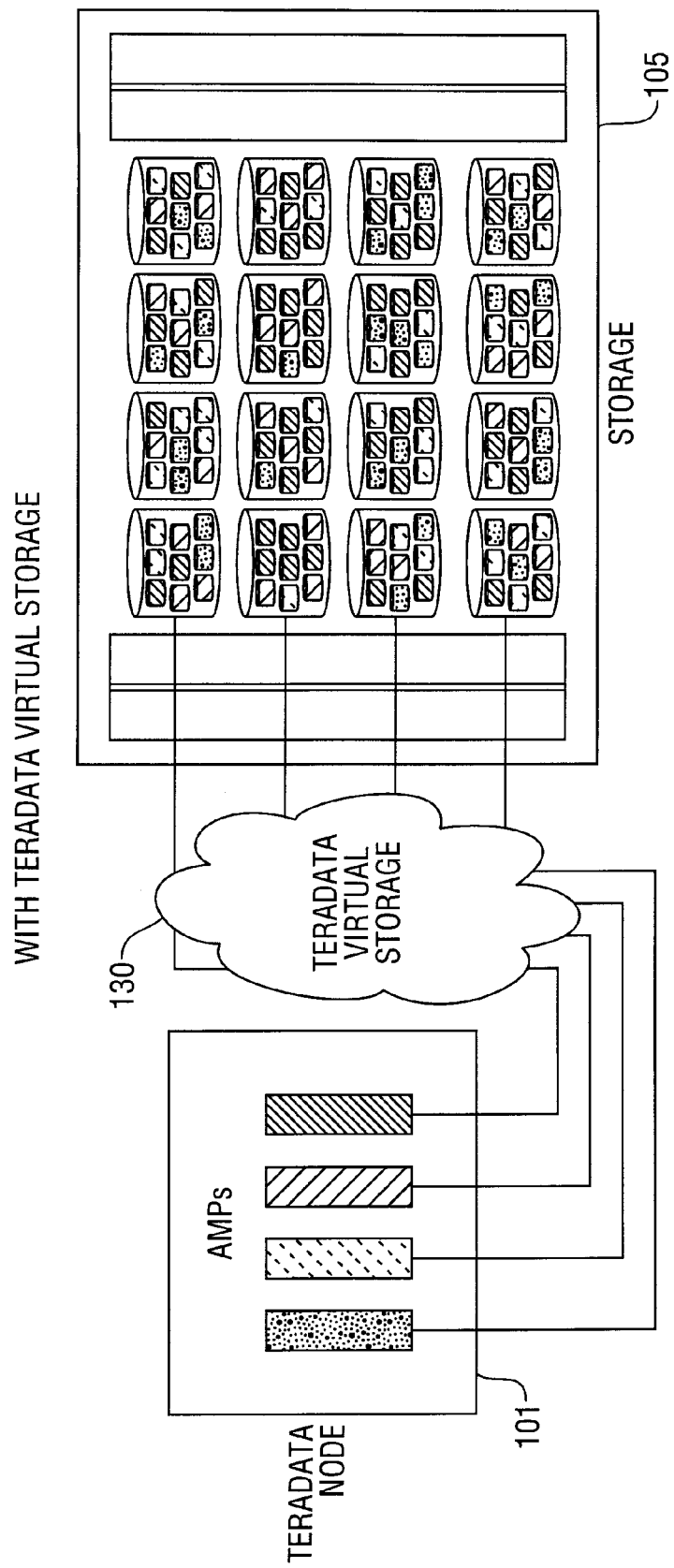
FIG. 3 is a simple illustration of the allocation of data storage in a Teradata Corporation data warehouse system utilizing Teradata Virtual Storage (TVS).

The techniques described below provide a means for allocating a data extent having a temperature $r_n$ to a storage device whose performance is impacted the least after the extent is allocated. Given a set of devices, each with a distinct service time ($T_{ser}$), arrival rate or temperature (r), and queue depth ($L_Q$), the next allocation with temperature ($r_n$) is placed on the device with the smallest amount of wait time.

The Teradata Virtual Storage (TVS) device allocation decision process described in U.S. Pat. No. 7,562,195 uses the following data which is collected by TVS:

1. Response time—the amount of time between when an IO request enters a device's queue and when the request is answered. This is equivalent to the sum of the device queue wait time and the device's service time; and
2. Temperature—the number of access to a particular piece of data in a specific amount of time. This is equivalent to the arrival rate of requests for that data (assuming system equilibrium).

The TVS system currently doesn't update response metrics. Therefore, in order to make decisions, information must be derived based upon data that is updated in real-time.

On homogenous systems of the past, placing allocations on devices with the smallest queue depth would be sufficient. However, more recent systems comprised of different classes of SSD and HDD devices with devices shared amongst AMPs require better methods of answering allocation placement questions. To this end, the service time ($T_{ser}$) for each device is used to determine allocations.

The TVS system periodically collects queue depths about each device as well as the temperature, or arrival rate, that is allocated to each device. Given the collected set of data points ($r_i$, $L_Q$), service time ($T_{ser}$) can be derived by the following method.

Beginning with the following equation from queuing theory:

$$L_Q = r * T_{ser}.$$

This equation is of the form:

$$y = bx + a.$$

Utilizing the mathematical procedure known as the method of least squares:

$$b = r_{PC} * \frac{\sigma_{L_Q}}{\sigma_r};$$

$$r_{PC} = \frac{\Sigma Z_{L_Q} Z_r}{n},$$

or the Pearson correlation of $r_i$, $L_Q$, where $Z_{L_Q}$ and $Z_r$ are the standard scores of $r_i$ and $L_Q$;

$$a = \overline{L_Q} - b\overline{r};$$

$\sigma_r$ and $\sigma_{L_Q}$ are the standard deviations of $r_i$ and $L_Q$; and $\overline{L_Q}$ and $\overline{r}$ are the means.

The value of b in the above is of interest as it represents the value of $T_{ser}$.

In addition to a device's service time, $T_{ser}$, the device's current queue depth, as well as the impact to a device's queue depth of adding $r_0$ (placing an extent with temperature $r_0$ on the given device) must be included in allocation decisions.

If the average wait time of an IO at the end of a device's queue is $T_{L_Q} = L_Q T_{ser}$, then the additional amount of wait time as a result of allocating an extent to the device is:

$$\frac{d}{dr} T_{L_Q} = \frac{d}{dr}(L_Q T_{se}),$$

$$= \frac{d}{dr}(r T_{se}) T_{se},$$

$$= \Delta r T_{ser}^2$$

Therefore, an extent with Δr allocated to a device would cause the IO at the end of the queue to experience a total wait time of:

$$\Rightarrow T_{L_Q} + \frac{d}{dr} T_{L_Q} = L_{Q_0} T_{ser} + \Delta r T_{ser}^2,$$

where $L_{Q_o}$ is the device's current queue depth, and $T_{ser}$ is the device's service time derived by least squares above.

Given this derived data, an extent's allocation destination is determined by selecting the device that minimizes the above equation.

Figure 4:
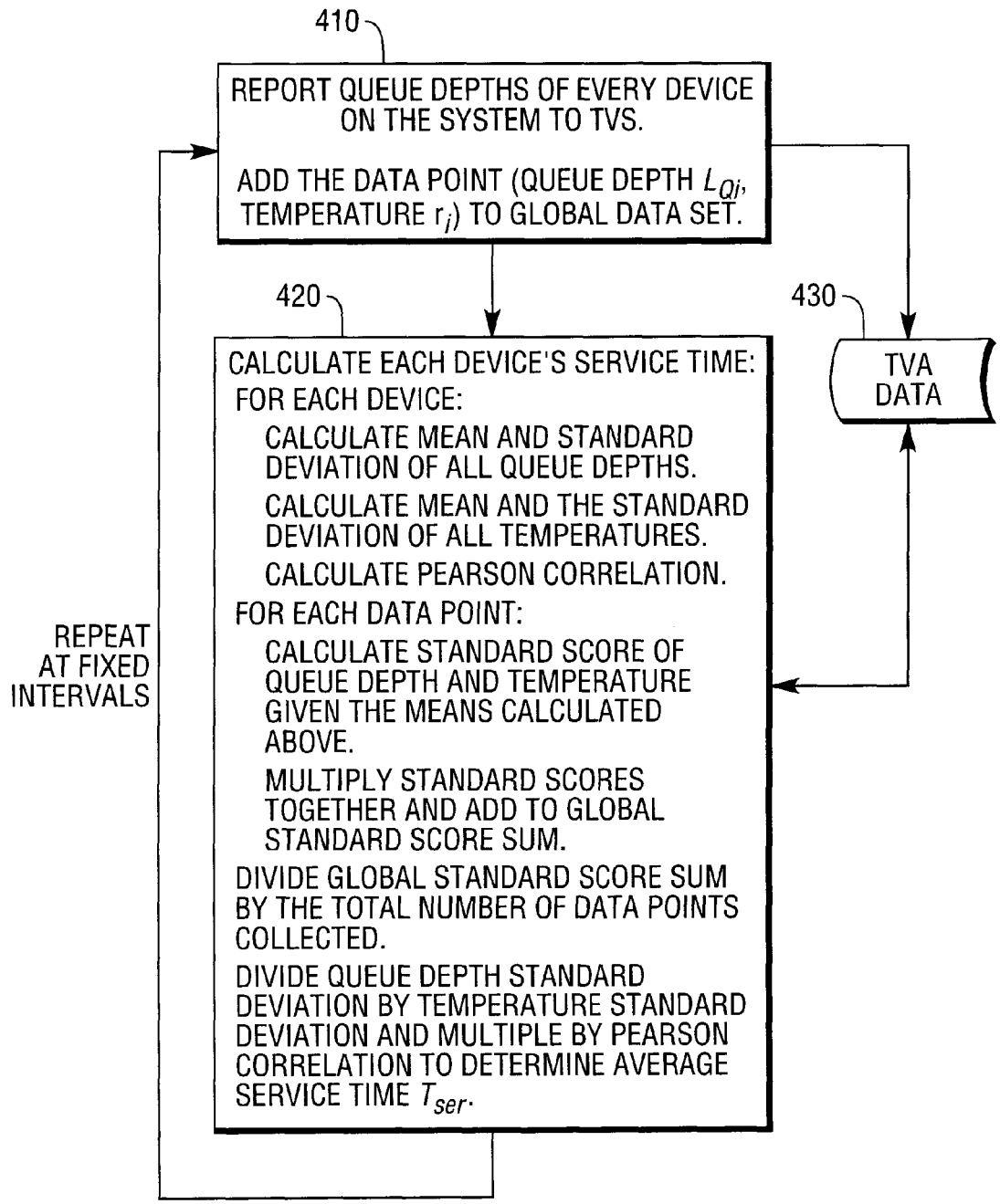
FIG. 4 provides a flowchart illustrating background processes for allocating resources in a mixed SSD and HDD storage environment in accordance with the present invention.
Figure 5:
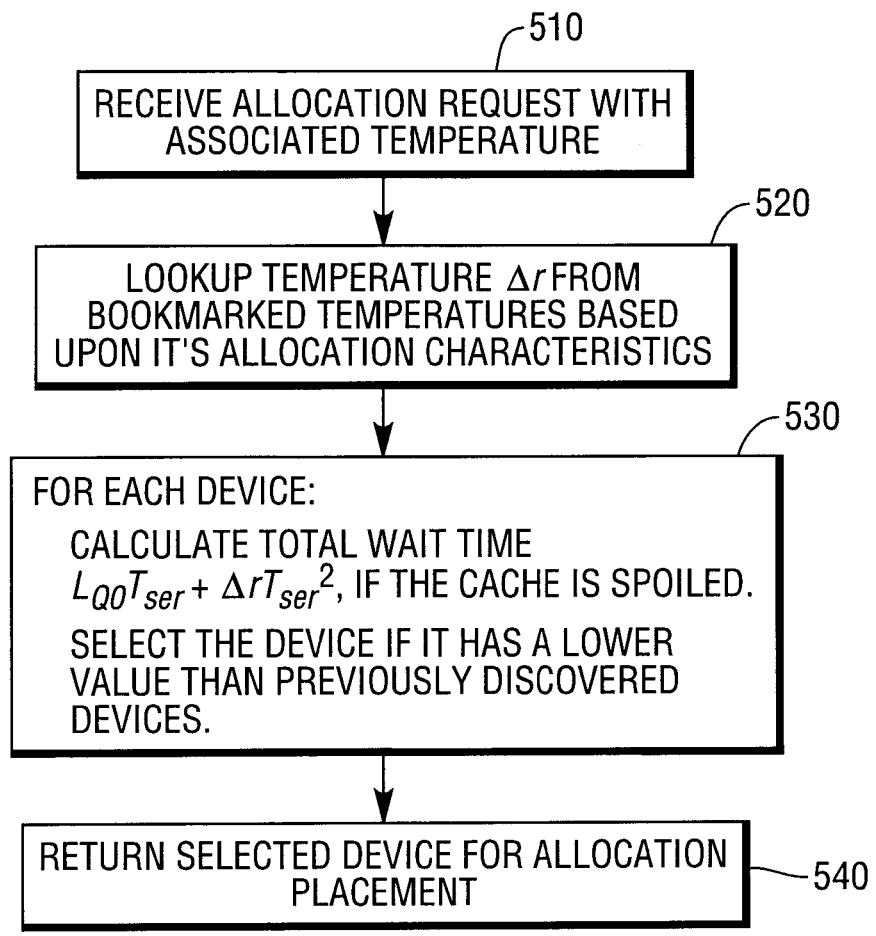
FIG. 5 provides a flowchart illustrating extent allocation processes in accordance with the present invention.

The improved method for allocating resources in a mixed SSD and HDD storage environment includes background processes, illustrated in FIG. 4, and allocation processes, illustrated in FIG. 5. These processes are outlined below.

FIG. 4 provides a flowchart illustrating background processes for allocating resources in a mixed SSD and HDD storage environment. As shown in step 410, at very specific periods of time, the queue depths of every device on the system are reported to the TVS system. For each device, the data point (queue depth, temperature) is added to the global data set 430.

Every new data point makes derivation more accurate. It is recommended that a new calculation be performed each time queue depths are reported. As shown in step 420, the service time for each device is re-calculated each time queue depths are reported.

For each device, the TVS background process:
Calculates the mean and then standard deviation of all queue depths;
Calculates the mean and the standard deviation of all temperatures; and
Calculates the Pearson correlation.

And for each data point the background process, the TVS background process:
Calculates the standard score of queue depth and temperature given the means calculated above; and
Multiplies the standard scores together and adds it to the global standard score sum.

Finally, the background process divides the global standard score sum by the total number of data points collected, and divides the queue depth standard deviation by the temperature standard deviation and multiple by the Pearson correlation above. The result of this is the average service time, $T_{ser}$.

FIG. 5 provides a flowchart illustrating the extent allocation process. As shown in step 510, an allocation request is received with associated temperature. In step 520, the allocation process will lookup Δr temperature from bookmarked temperatures based upon it's allocation characteristics, e.g., static hot would derive the ultra hot temperature value.

As shown in step 530, for each device the allocation process:
Calculates $L_{Q0} T_{ser} + \Delta r T_{ser}^2$, if the cache is spoiled; and
Selects the device if it has a lower value than previously discovered devices.

In step 540, the selected device for allocation placement is returned.

The figures and specification illustrate and describe a new method for allocating resources in a mixed SSD and HDD storage environment. Data placement based upon real-time collected temperature and queue depth allows for improved utilization of storage resources.

Another use of the system and method described herein is for placement of data with very short longevities, such as spool. Currently spool is placed on SSDs by default. Production systems may encounter customer queries that consume large amounts of spool, overburdening SSD storage while leaving HDD storage idle, and thus hampering performance. This method can guard against this misallocation or storage resources by diverting spool allocations to alternate devices until it becomes beneficial again to use SSDs.

Additionally, future systems may contain different performance classes of SSD storage devices. The method of the present invention can insure workloads are distributed evenly among these devices of different sizes and performances.

On systems with shared devices, the method described herein can detect devices experiencing high loads, and begin placing new allocations on alternate devices. Additionally, this method can initiate migrations of data from devices identified as overburdened.

The foregoing description of the invention has been presented for purposes of illustration and description. It is not intended to be exhaustive or to limit the invention to the precise form disclosed.

Additional alternatives, modifications, and variations will be apparent to those skilled in the art in light of the above teaching.

What is claimed is:

1. A computer-implemented method for allocating resources in an electronic data storage environment comprising multiple electronic data storage devices, the method comprising the steps of:
   repetitively, by a computer, collecting data points comprising queue depths ($L_Q$) and temperatures ($r_i$) corresponding to each storage device; and for each storage device, calculating from said set of data points ($r_i$, $L_Q$), a service time ($T_{ser}$);
   receiving, by said computer, a data allocation request including an estimated frequency of access for said data;
   for each storage device, calculating, by said computer, a total wait time from said estimated frequency of access for said data, a current queue depth for said each storage device, and the service time for said each storage device;
   selecting, by said computer, a storage device having a minimum total wait time; and
   returning, by said computer, the selected storage device for data allocation.

2. The method for allocating resources in an electronic data storage environment comprising multiple electronic data storage devices according to claim 1, wherein said multiple electronic data storage devices comprise solid state drives and hard disk drives.

3. The method for allocating resources in an electronic data storage environment comprising multiple electronic data storage devices according to claim 1, wherein said steps of collecting data points and calculating service times ($T_{ser}$) is repeated at a fixed interval.

4. The method for allocating resources in an electronic data storage environment comprising multiple electronic data storage devices according to claim 1, wherein said electronic data storage environment comprises a relational database system.

5. An electronic data storage system, comprising:
   multiple electronic data storage devices; and
   a processor for:
   repetitively collecting data points comprising queue depths ($L_Q$) and temperatures ($r_i$) corresponding to each storage device; and for each storage device, calculating from said set of data points ($r_i$, $L_Q$), a service time ($T_{ser}$);
   receiving a data allocation request including an estimated frequency of access for said data;
   for each storage device, calculating a total wait time from said estimated frequency of access for said data, a current queue depth for said each storage device, and the service time for said each storage device;
   selecting for allocation a storage device having a minimum total wait time; and
   returning the selected storage device for data allocation.

6. The electronic data storage system according to claim 5, wherein said multiple electronic data storage devices comprise solid state drives and hard disk drives.

7. The electronic data storage system according to claim 5, wherein said processor collects data points and calculates service times ($T_{ser}$) at a fixed interval.

8. The electronic data storage system according to claim 5, wherein said electronic data storage system comprises a relational database system.

* * * * *